No. 798,828. PATENTED SEPT. 5, 1905.
C. W. POWELL.
SELF LOCKING NUT.
APPLICATION FILED JULY 9, 1904.
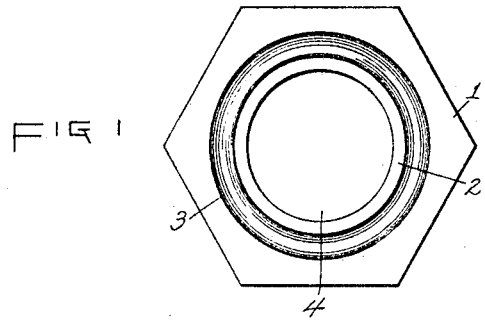
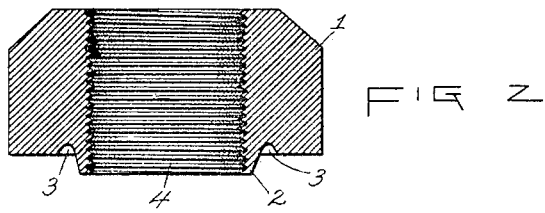
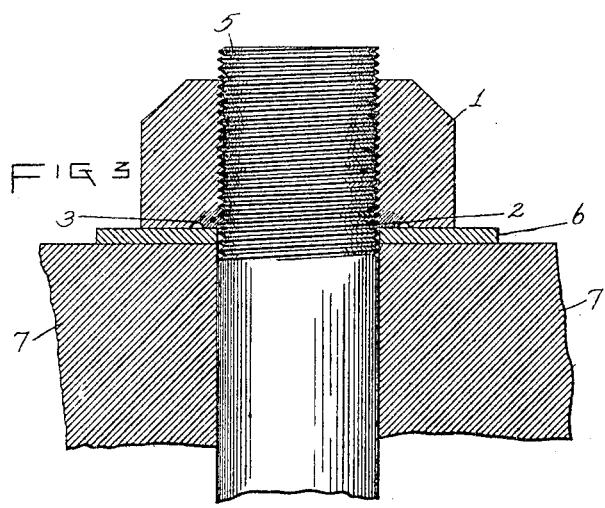
WITNESSES
INVENTOR
Charles W. Powell
By Mosher & Curtis
Attys

UNITED STATES PATENT OFFICE.

CHARLES W. POWELL, OF GREEN ISLAND, NEW YORK.

SELF-LOCKING NUT.

No. 798,828.   Specification of Letters Patent.   Patented Sept. 5, 1905.

Application filed July 9, 1904. Serial No. 215,875.

*To all whom it may concern:*

Be it known that I, CHARLES W. POWELL, a citizen of the United States, residing at Green Island, county of Albany, and State of New York, have invented certain new and useful Improvements in Self-Locking Nuts, of which the following is a specification.

The invention relates to such improvements; and it consists of the novel construction and combination of parts hereinafter described and subsequently claimed.

Reference may be had to the accompanying drawings and the reference characters marked thereon, which form a part of this specification.

Similar characters refer to similar parts in the several figures therein.

Figure 1 of the drawings is a plan view of the inner side of my improved self-locking nut. Fig. 2 is a central vertical cross-section of the same. Fig. 3 is a similar sectional view showing the nut applied to a bolt with its locking-flange upset by engagement with the body against which the nut abuts.

The object of my invention is to provide a nut with self-contained means whereby the same may be tightly locked when forced to its seat upon the screw-threaded bolt adapted to receive the same.

In carrying out my invention I provide the nut 1 with a flange-aperture adapted to be upset by engagement with the body against which the nut abuts.

The flange 2 may be of any desired form; but I have shown in the drawings and prefer to employ an annular flange completely surrounding the bolt-aperture. I also prefer to provide the inner face of the nut with an annular recess or groove 3 on the outer side of said flange adapted to facilitate the yielding of the flange when upset. The screw-threaded bolt-aperture 4 extends entirely through the nut adapted to receive the screw-bolt 5 and turn freely thereon in the usual manner until the flange on the inner end of the nut engages the body against which the nut is to abut. After the flange has been brought into contact with the abutting body it is forcibly driven against said body by further rotation of the nut upon the bolt until the flange is crushed and upset sufficiently to permit the inner face of the nut to engage said body.

In Fig. 3 the nut is shown fully seated upon the bolt and against the abutting body, with the flange 2 crushed or upset sufficiently to bring it into the plane of the inner face of the nut. As a result of this crushing or upsetting of the flange 2 the metal thereof is driven tightly into the screw-thread grooves in the bolt 3, effectively locking the nut against rotative movement upon the bolt except by the application of great force.

A metal washer 6 may be interposed between the nut and the body 7, adapted to be clamped by the nut when said body 7 is not hard enough to afford the necessary resistance to accomplish the upsetting or crushing of the flange on the nut.

The washer 6 may be omitted when the body 7 is adapted to afford the necessary resistance.

A nut locked in this manner is adapted to resist all ordinary influences tending to induce an unlocking rotative movement of the same, yet can be forcibly loosened by the use of a wrench.

It is characteristic of my invention that the self-locking flange projects beyond the plane of the outlying portions of the face of the nut, so that it is adapted to be crushed or upset by engagement with any plane-surfaced body against which the face of the nut abuts, whereby the nut has in itself all the elements of peculiar construction necessary for the successful operation of the device.

What I claim as new, and desire to secure by Letters Patent, is—

The combination with a resistance-plate provided with a bolt-aperture and having an outer plane surface surrounding said aperture; of a screw-bolt projecting through said aperture in the resistance-plate; and a nut provided with a screw-threaded aperture to receive said bolt, and having adjacent to said bolt-aperture a flange projecting beyond the plane of the outlying portions of the face of said nut adapted to engage and be upset by said plane surface on the resistance-plate, the face of said nut being provided with a recess surrounding said flange.

In testimony whereof I have hereunto set my hand this 27th day of June, 1904.

CHARLES W. POWELL.

Witnesses:
E. M. O'REILLY,
L. E. BOOTH.